United States Patent
Stewart et al.

(10) Patent No.: US 7,155,133 B2
(45) Date of Patent: Dec. 26, 2006

(54) AVALANCHE PHOTODIODE CONTROLLER CIRCUIT FOR FIBER OPTICS TRANSCEIVER

(75) Inventors: James Stewart, San Jose, CA (US); Anthony Ho, Sunnyvale, CA (US); Rudolf J. Hofmeister, Sunnyvale, CA (US); Darin James Douma, Monrovia, CA (US); Lucy G. Hosking, Santa Cruz, CA (US); Andreas Weber, Los Altos, CA (US); Jeffrey Bryant Price, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/101,258

(22) Filed: Mar. 18, 2002

(65) Prior Publication Data

US 2003/0210917 A1    Nov. 13, 2003

Related U.S. Application Data

(60) Provisional application No. 60/357,075, filed on Feb. 12, 2002.

(51) Int. Cl.
*H04B 10/06*    (2006.01)

(52) U.S. Cl. ............ 398/202; 250/214 R; 250/214 SW

(58) Field of Classification Search ................ 702/191; 250/214 R, 214 C, 214 SW; 356/73.1, 5.01; 386/101; 320/114; 156/345.13; 398/196, 398/166, 202, 208, 210; 439/557; 370/458; 323/315, 303; 330/257
See application file for complete search history.

(56) References Cited

U.S. PATENT DOCUMENTS 3,697,860 A * 10/1972 Baker ......................... 323/271

(Continued)

FOREIGN PATENT DOCUMENTS

EP    1 006 591 A2    6/2000

(Continued)

OTHER PUBLICATIONS

Ramaswami, R. and K.N. Sivarajan. Optical Networks: A Practical Perspective. San Francisco: Morgan Kaufmann Publishers, Inc., 1998.*

(Continued)

*Primary Examiner*—Kenneth Vanderpuye
*Assistant Examiner*—David S. Kim
(74) *Attorney, Agent, or Firm*—Workman Nydegger

(57) ABSTRACT

A controller for controlling the reverse-bias voltage of an avalanche photodiode in a transceiver or receiver. The controller includes memory for storing information related to the avalanche photodiode, and analog to digital conversion circuitry for receiving an analog signal corresponding to the temperature of the avalanche photodiode, converting the received analog signal into a digital value, and storing the digital value in a predefined location within the memory. Control circuitry in the controller controls the operation of the avalanche photodiode and a temperature lookup table store in the memory. A serial interface enables a host device to read from and write to locations within the memory. The invention also controls the reverse-bias voltage of an avalanche photodiode in a transceiver or receiver.

10 Claims, 10 Drawing Sheets

U.S. PATENT DOCUMENTS

| | | | |
|---|---|---|---|
| 4,292,514 A | | 9/1981 | Ohtomo |
| 4,331,913 A | * | 5/1982 | Sparber ................. 323/303 |
| 4,659,997 A | * | 4/1987 | Ferland et al. ............ 330/257 |
| 5,184,272 A | * | 2/1993 | Suda et al. ................ 361/87 |
| 5,278,404 A | | 1/1994 | Yeates |
| 5,481,104 A | * | 1/1996 | Miller et al. ............ 250/214 C |
| 5,929,982 A | | 7/1999 | Anderson |
| 5,953,690 A | * | 9/1999 | Lemon et al. ............ 702/191 |
| 6,031,219 A | * | 2/2000 | Shuke ................. 250/214 R |
| 6,157,022 A | | 12/2000 | Maeda et al. |
| 6,188,059 B1 | * | 2/2001 | Nishiyama et al. ..... 250/214 R |
| 6,313,459 B1 | * | 11/2001 | Hoffe et al. ............ 250/214 R |
| 6,333,804 B1 | * | 12/2001 | Nishiyama et al. ........ 398/202 |
| 6,538,790 B1 | * | 3/2003 | Hatakeyama et al. ...... 398/202 |
| 6,643,472 B1 | * | 11/2003 | Sakamoto et al. ......... 398/202 |
| 6,888,863 B1 | | 5/2005 | Chen et al. |

FOREIGN PATENT DOCUMENTS

| | | | |
|---|---|---|---|
| EP | 1006591 A2 | * | 6/2000 |
| EP | 1372261 A1 | * | 12/2003 |
| JP | 58073251 A | * | 5/1983 |
| JP | 05129857 A | * | 5/1993 |

OTHER PUBLICATIONS

Horowitz, P. and W. Hill. The Art of Electronics. New York: Cambridge University Press, 1989.*

"DC-DC Converter Tutorial." Maxim Integrated Products, Inc. Oct. 19, 2000. accessed on May 20, 2005 <http://www.maxim-ic.com/appnotes.cfm/appnote_number/710/ln/en>.*

English translation of Japanese document Shimodaira (JP 58073251 A) by Schreiber Translations, Inc. USPTO. Washington, D.C. Dec. 2005.*

* cited by examiner

AVALANCHE PHOTODIODE CONTROLLER CIRCUIT FOR FIBER OPTICS TRANSCEIVER

The present application claims priority to U.S. Provisional Patent Application filed Feb. 12, 2002, Ser. No. 60/357,075, which is incorporated herein by reference.

RELATED APPLICATION

This application is related to copending U.S. patent application Ser. No. 09/777,917 filed Feb. 5, 2001, which is incorporated herein by reference.

FIELD OF THE INVENTION

The present invention relates generally to the field of fiber optic transceivers. More particularly, the invention relates to optoelectronic transceivers and optoelectronic receivers having avalanche photodiodes and to circuits for controlling avalanche photodiodes in optoelectronic transceivers and optoelectronic receivers.

BACKGROUND OF INVENTION

FIG. 1 shows a schematic representation of the essential features of a typical prior-art fiber optic transceiver. The main circuit 1 contains at a minimum transmit and receive circuit paths and power 19 and ground connections 18. The receiver circuit typically consists of a Receiver Optical Subassembly (ROSA) 2 which contains a mechanical fiber receptacle and coupling optics as well as a photodiode and pre-amplifier (preamp) circuit. The ROSA is in turn connected to a post-amplifier (postamp) integrated circuit 4, the function of which is to generate a fixed output swing digital signal which is connected to outside circuitry via the RX+ and RX− pins 17. The postamp circuit 4 also often provides a digital output signal known as Signal Detect or Loss of Signal indicating the presence or absence of suitably strong optical input. The Signal Detect output is provided at output pin 18. The transmit circuit will typically consist of a Transmitter Optical Subassembly (TOSA) 3 and a laser driver integrated circuit 5. The TOSA contains a mechanical fiber receptacle and coupling optics as well as a laser diode or LED. The laser driver circuit will typically provide AC drive and DC bias current to the laser. The signal inputs for the AC driver are obtained from the TX+ and TX− pins 12. The laser driver circuitry typically will require individual factory setup of certain parameters such as the bias current (or output power) level and AC modulation drive to the laser. Typically this is accomplished by adjusting variable resistors or placing factory selected resistors 7, 9 (i.e., having factory selected resistance values). Additionally, temperature compensation of the bias current and modulation is often required. This function can be integrated in the laser driver integrated circuit or accomplished through the use of external temperature sensitive elements such as thermistors 6,8.

In addition to the most basic functions described above, some transceiver platform standards involve additional functionality. Examples of this are the TX disable 13 and TX fault 14 pins described in the GBIC (Gigabit Interface Converter) standard. In the GBIC standard (SFF-8053), the TX disable pin allows the transmitter to be shut off by the host device, while the TX fault pin is an indicator to the host device of some fault condition existing in the laser or associated laser driver circuit. In addition to this basic description, the GBIC standard includes a series of timing diagrams describing how these controls function and interact with each other to implement reset operations and other actions. Most of this functionality is aimed at preventing non-eyesafe emission levels when a fault conditions exists in the laser circuit. These functions may be integrated into the laser driver circuit itself or in an optional additional integrated circuit 11. Finally, the GBIC standard for a Module Definition "4" GBIC also requires the EEPROM 10 to store standardized ID information that can be read out via a serial interface (defined as using the serial interface of the ATMEL AT24C01A family of EEPROM products) consisting of a clock 15 and data 16 line.

As an alternative to mechanical fiber receptacles, some prior art transceivers use fiber optic pigtails which are unconnectorized fibers.

Similar principles clearly apply to fiber optic transmitters or receivers that only implement half of the transceiver functions.

It is desirable to use avalanche photodiodes in some transceivers, because avalanche photodiodes have a sensitivity that is 10 dB greater than the sensitivity of the PIN diodes that have been used in previous transceivers. Avalanche photodiodes are characterized by avalanche breakdowns, which occur when the reverse-bias voltage applied to a particular avalanche photodiode is set to a particular value. The sensitivity of an avalanche diode is maximized when it is operated at a reverse-bias voltage that is a small increment below its avalanche voltage, which typically is approximately −50 volts. Unfortunately, avalanche voltages vary from one device to the next, and they also vary as a function of the temperature of the particular device. Therefore, to achieve maximum sensitivity, either the temperature of an avalanche photodiode must be controlled or else the reverse-bias voltage applied to the avalanche photodiode must be adjusted for different operating temperatures.

One prior art approach uses thermistors whose electrical resistance changes as a function of temperature to control the reverse-bias voltage applied to the avalanche photodiode. Under high-volume manufacturing conditions, however, this approach is not desirable because each receiver/transceiver has to be manually tuned to account for variations among thermistors and photodiodes.

Another prior art approach uses a temperature controller to maintain a steady operating temperature for the avalanche photodiode. This approach, however, is generally not feasible for pluggable optoelectronic transceivers/receivers because temperature controllers are typically too big to fit within such devices. For example, the dimensions for a pluggable optoelectronic transceiver specified by GBIC (Gigabit Interface Converter) standards are 1.2"×0.47"×2.6", and the dimensions for an optoelectronic transceiver specified by SFP (Small Form Factor Pluggable) standards are 0.53"×0.37"×2.24". As pluggable optoelectronic transceivers/transmitters become more and more compact, the use of temperature controller in these devices is becoming less and less feasible.

Accordingly, what is needed is a method and system to maintain desirable sensitivity of an avalanche photodiode over temperature variations.

SUMMARY OF THE INVENTION

The present invention is preferably implemented as an optoelectronic transceiver or optoelectronic receiver in which an avalanche photodiode is situated in a housing along with a power supply for supplying a reverse-bias voltage to the avalanche photodiode and an integrated circuit. The integrated circuit stores data specific to the avalanche photodiode, and it is configured to output a control signal to the power supply. In some embodiments, the optoelectronic transceiver or optoelectronic receiver also includes a temperature sensor in the housing for measuring the temperature of the avalanche photodiode and the integrated circuit is configured to process a signal from the temperature sensor. The temperature sensor may be a part of the integrated circuit, or else it may be a separate device located in the housing.

The integrated circuit typically includes nonvolatile memory for storing information relating to the avalanche photodiode; an interface with a host device for reading from and writing to the memory; analog to digital conversion circuitry for receiving analog signals, converting them to digital values and storing the digital values in the memory; logic for determining a control value; and digital to analog conversion circuitry for converting the control value to a control signal for the power supply. The logic in the integrated circuit determines the control value based in part on a temperature lookup table in the memory and also digital values associated with a signal from the temperature sensor. The present invention may also be implemented as an integrated circuit.

Another embodiment of the present invention is a method for controlling an optoelectronic transceiver or an optoelectronic receiver. The method includes steps for receiving an analog signal that corresponds to the temperature of the avalanche photodiode, converting the analog signal to a digital value for storage in memory, and generating a control signal to control the reverse-bias voltage of an avalanche photodiode from information stored in the memory.

Yet another embodiment of the present invention is a method for calibrating an optoelectronic transceiver or an optoelectronic receiver. The method includes steps for setting the temperature of the avalanche photodiode to a specified value, determining an optimal reverse-bias voltage for the avalanche photodiode, and storing digital values corresponding to the temperature and the optimal reverse-bias voltage in memory. In one embodiment, the optimal reverse-bias voltage is obtained by adjusting the reverse-bias voltage until the bit error rate for the avalanche photodiode is minimized. In another embodiment, the optimal reverse-bias voltage is approximated by adjusting the reverse-bias voltage until an avalanche breakdown occurs, reducing the reverse-bias voltage by an offset voltage, and storing digital values corresponding to the temperature and the reduced reverse-bias voltage in memory. The method may also include repeating the above steps at a number of specified temperatures in order to generate a temperature lookup table for storage in an integrated circuit of an optoelectronic transceiver or an optoelectronic receiver.

BRIEF DESCRIPTION OF THE DRAWINGS

For a better understanding of the invention, reference should be made to the following detailed description taken in conjunction with the accompanying drawings, in which.

DESCRIPTION OF PREFERRED EMBODIMENTS

Preferred embodiments of the invention are described below. In the interest of clarity, not all features of an actual implementation are described. It will be appreciated that in the development of any such embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
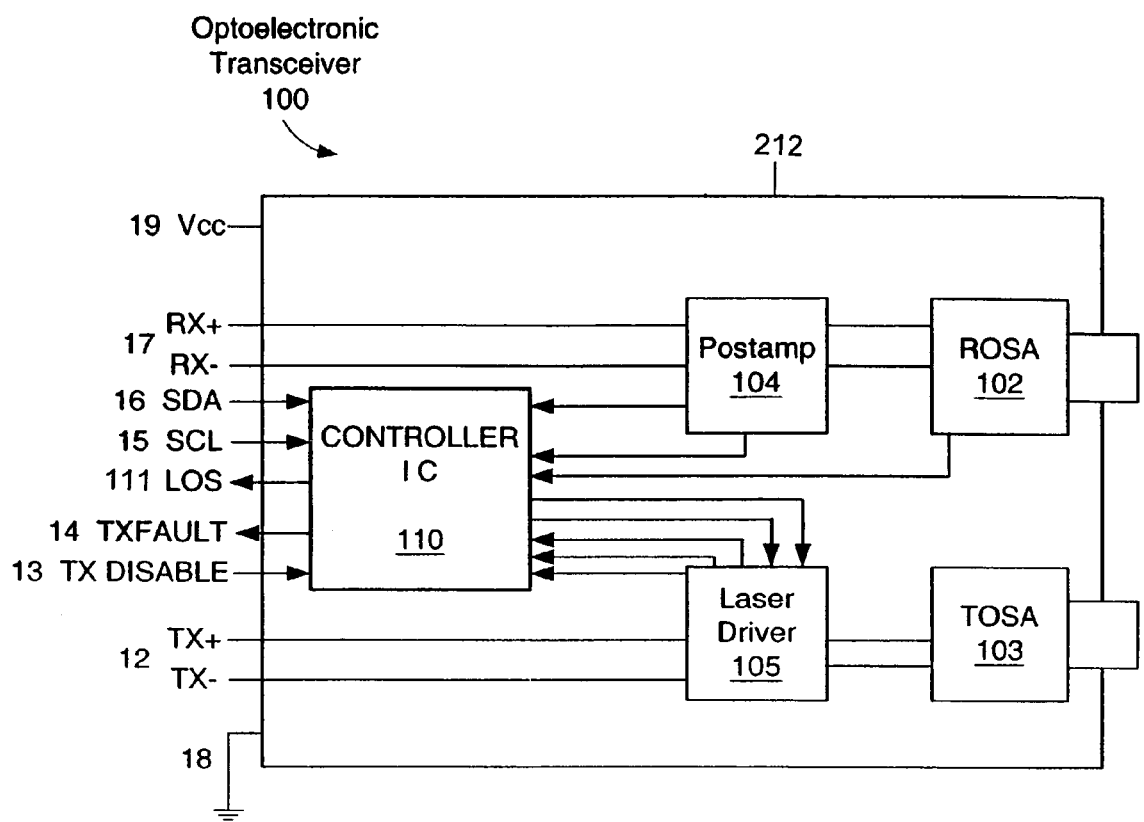
FIG. 2 is a block diagram of an optoelectronic transceiver in accordance with the present invention.
Figure 3:
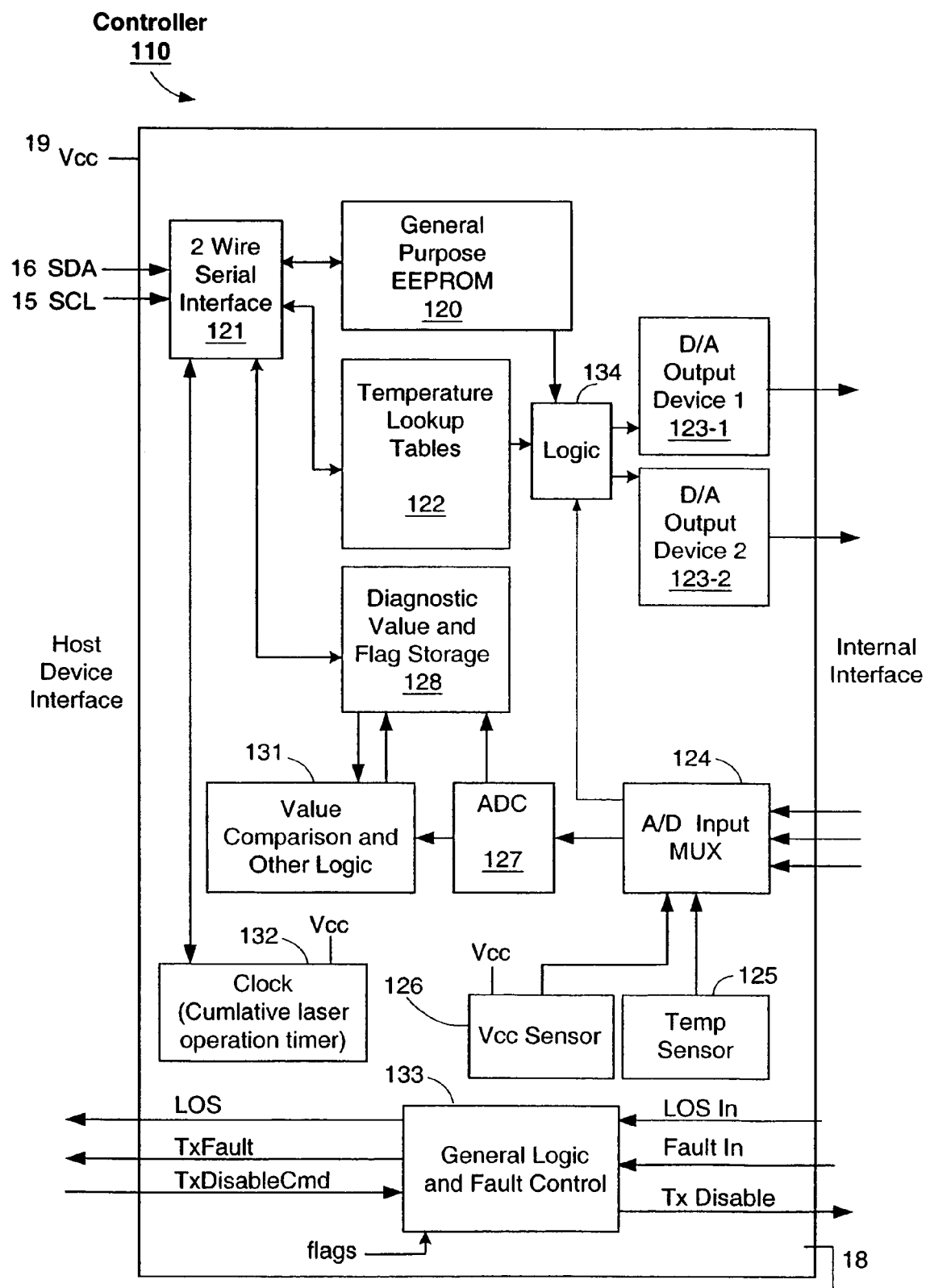
FIG. 3 is a block diagram of modules within the controller IC of the optoelectronic transceiver of FIG. 2.

A transceiver 100 based on the present invention is shown in FIGS. 2 and 3. The transceiver 100 contains a Receiver Optical Subassembly (ROSA) 102 and Transmitter Optical Subassembly (TOSA) 103 along with associated post-amplifier 104 and laser driver 105 integrated circuits that communicate the high speed electrical signals to the outside world. Other control and setup functions are implemented with a third single-chip integrated circuit 110 called the controller IC. All the components of the transceiver 100 are preferably located in a protective housing 212 except for connectors that may protrude from the housing. Suitable housings, including metallic, plastic, potting box and other housing structures are well known in the art.

The controller IC 110 handles all low speed communications with a host device. These include the standardized pin functions such as Loss of Signal (LOS) 111, Transmitter Fault Indication (TX FAULT) 14, and the Transmitter Disable Input (TXDIS) 13. The controller IC 110 has a two wire serial interface 121, also called the memory interface, for reading and writing to memory mapped locations in the controller.

The interface 121 is coupled to host device interface input/output lines, typically clock (SCL) and data (SDA) lines, 15 and 16. In one embodiment, the serial interface 121 operates in accordance with the two wire serial interface standard that is also used in the GBIC and SFP (Small Form Factor Pluggable) standards. Other interfaces could be used in alternate embodiments. The two wire serial interface 121 is used for all setup and querying of the controller IC 11, and enables access to the optoelectronic transceiver's control circuitry as a memory mapped device. That is, tables and parameters are set up by writing values to predefined memory locations of one or more nonvolatile memory devices 120, 121, 128 (e.g., EEPROM devices) in the controller, whereas diagnostic and other output and status values are output by reading predetermined memory locations of the same nonvolatile memory devices 120, 122, 128. This technique is consistent with currently defined serial ID functionality of many transceivers where a two wire serial interface is used to read out identification and capability data stored in an EEPROM.

It is noted here that some of the memory locations in the memory devices 120, 122, 128 are dual ported, or even triple ported in some instances. That is, while these memory mapped locations can be read and in some cases written via the serial interface 121, they are also directly accessed by other circuitry in the controller IC 110. For instance, certain "margining" values stored in memory 120 are read and used directly by logic 134 to adjust (i.e., scale upwards or downwards) drive level signals being sent to the digital to analog output devices 123. Similarly, there are flags stored memory 128 that are (A) written by logic circuit 131, and (B) read directly by logic circuit 133. An example of a memory mapped location not in the memory devices but that is effectively dual ported is the output or result register of clock 132. In this case the accumulated time value in the register is readable via the serial interface 121, but is written by circuitry in the clock circuit 132.

In addition to the result register of the clock 132, other memory mapped locations in the controller may be implemented as registers at the input or output of respective sub-circuits of the controller. For instance, the margining values used to control the operation of logic 134 may be stored in registers in or near logic 134 instead of being stored within memory device 128.

As shown in FIGS. 2 and 3, the controller IC 110 has connections to the laser driver 105 and receiver components. These connections serve multiple functions. The controller IC 110 has a multiplicity of digital to analog converters 123. In one embodiment the digital to analog converters are implemented as current sources, but in other embodiments the digital to analog converters may be implemented using voltage sources, and in yet other embodiments the digital to analog converters may be implemented using digital potentiometers. In some embodiments, the output signals of the digital to analog converters are used to control key parameters of the laser driver circuit 105. In one embodiment, outputs of the digital to analog converters 123 are used to directly control the laser bias current as well as to control the AC modulation level to the laser (constant bias operation). In another embodiment, the outputs of the digital to analog converters 123 of the controller IC 110 control the level of average output power of the laser driver 105 in addition to the AC modulation level (constant power operation).

In some embodiments, the controller IC 110 includes mechanisms to compensate for temperature dependent characteristics of the laser. This is implemented in the controller IC 110 through the use of temperature lookup tables 122 that are used to assign values to the control outputs as a function of the temperature measured by a temperature sensor 125 within the controller IC 110. In other embodiments, the controller IC 110 may use digital to analog converters with voltage source outputs or may even replace one or more of the digital to analog converters 123 with digital potentiometers to control the characteristics of the laser driver 105. It should also be noted that while FIG. 2 refers to a system where the laser driver 105 is specifically designed to accept inputs from the controller IC 110, it is possible to use the controller IC 110 with many other laser driver ICs to control their output characteristics.

In addition to the connection from the controller IC 110 to the laser driver 105, FIG. 2 shows a number of connections from the laser driver 105 to the controller IC 11, as well as similar connections from the ROSA 102 and Postamp 104 to the controller IC 110. These are analog monitoring connections that the controller IC 110 uses to provide diagnostic feedback to the host device via memory mapped locations in the controller IC. The controller IC 110 in one embodiment has a multiplicity of analog inputs. The analog input signals indicate operating conditions of the transceiver and/or receiver circuitry. These analog signals are scanned by a multiplexer 124 and converted using an analog to digital convert (ADC) 127. The ADC 127 has 12 bit resolution in one embodiment, although ADC's with other resolution levels may be used in other embodiments. The converted values are stored in predefined memory locations, for instance in the diagnostic value and flag storage device 128 shown in FIG. 3, and are accessible to the host device via memory reads. These values are calibrated to standard units (such as millivolts or microwatts) as part of a factory calibration procedure.

The digitized quantities stored in memory mapped locations within the controller IC include, but are not limited to, the laser bias current, transmitted laser power, and received power as well corresponding limit values, flag values, and configuration values (e.g., for indicating the polarity of the flags).

As shown in FIG. 3, the controller IC 110 includes a voltage supply sensor 126. An analog voltage level signal generated by this sensor is converted to a digital voltage level signal by the ADC 127, and the digital voltage level signal is stored in memory 128. Similarly, the temperature sensor 125 in the controller IC 110 generates a signal that is converted by the ADC 127 into a digital temperature level signal, and the digital temperature level signal is stored in memory 128. In one embodiment, the analog to digital input mux 124 and ADC 127 are controlled by a clock signal so as to automatically, periodically convert the monitored signals into digital signals, and to store those digital values in memory 128.

Figure 4:
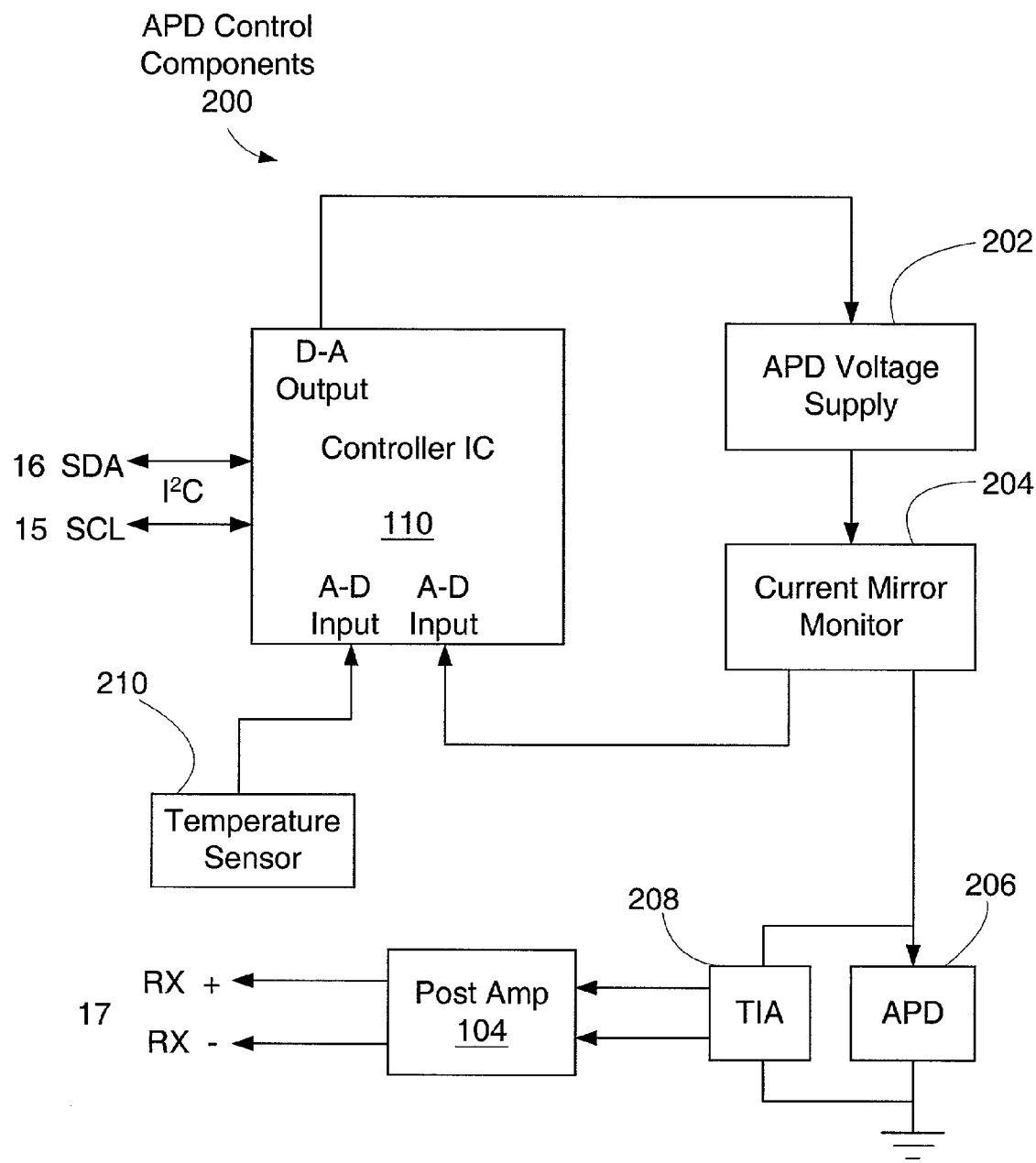
FIG. 4 is a block diagram of components of an optoelectronic transceiver having an avalanche photodiode in accordance with an embodiment of the present invention.

FIG. 4 illustrates components of an optoelectronic transceiver having an avalanche photodiode in accordance with an embodiment of the present invention. These components are all located within the transceiver housing 212 (FIG. 2). In the embodiment in FIG. 4, the controller IC 110 regulates the reverse-bias voltage applied to an avalanche photodiode 206. As is well known in the art, if the reverse-bias voltage applied to an avalanche photodiode is increased, an avalanche breakdown will eventually occur at a characteristic avalanche voltage $V_A$. The avalanche voltage $V_A$ is typically in a range between 40 volts and 70 volts at room temperature, and it varies from one device to another and also as a (generally increasing) function of the temperature of the avalanche photodiode. The sensitivity of an avalanche photodiode is maximized when it is operated at a reverse-bias voltage $V_{APD}$ that is less than the avalanche voltage $V_A$ by an offset voltage that is relatively small (approximately 1 volt for some avalanche photodiodes). The controller IC 110 may be used to regulate the reverse-bias voltage $V_{APD}$ applied to an avalanche photodiode so that the maximum sensitivity of the avalanche photodiode is maintained over a range of temperatures.

Figure 5:
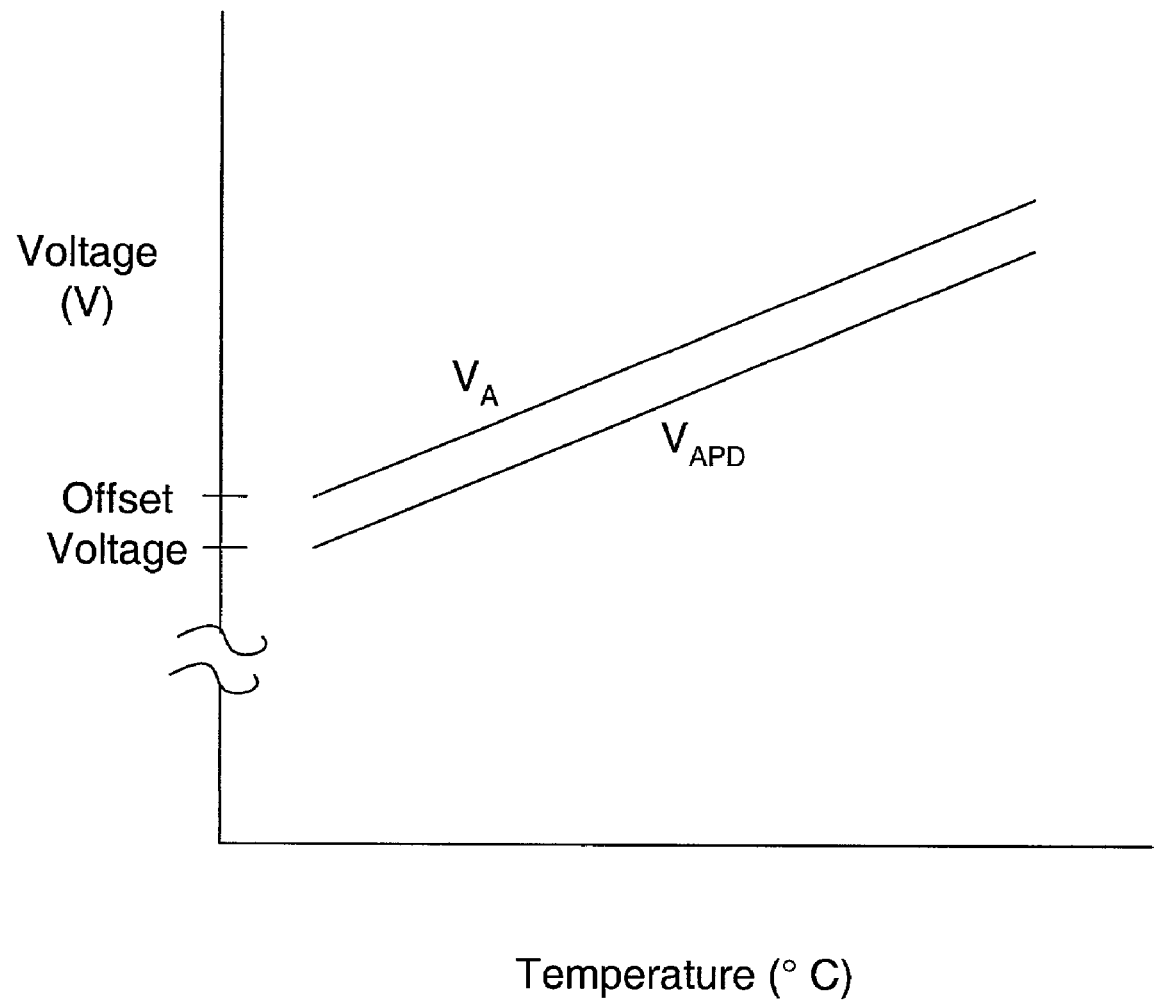
FIG. 5 is a graph of the avalanche voltage and optimal reverse-bias voltage for a typical avalanche photodiode plotted as a function of temperature.

FIG. 5 is a graph showing the avalanche voltage $V_A$ and the optimal reverse-bias voltage $V_{APD}$ plotted as a function of temperature for a typical avalanche photodiode. As shown in FIG. 5, the lines representing the avalanche voltage $V_A$ and the optimal reverse-bias voltage $V_{APD}$ are separated by an offset voltage. The offset voltage shown in FIG. 5 is constant, but it may vary with the temperature.

Referring again to FIG. 4, the controller IC 110 outputs a signal to an APD power supply circuit 202 that provides a reverse-bias voltage for an avalanche photodiode 206. A current mirror monitor circuit 204 is coupled between the APD power supply circuit 202 and the avalanche photodiode 206. The current mirror monitor 204 passes the reverse-bias current to the avalanche photodiode 206 and also produces a mirrored current signal that is provided as an input to the controller IC 110. The current mirror signal is proportional to the current passing through the avalanche photodiode 206, which is also proportional to the received power of the avalanche photodiode 206. The current mirror signal is used to monitor the received power of the avalanche photodiode 206 during operation, and sense avalanche breakdown during calibration of the optoelectronic transceiver 100. The output signal from the avalanche photodiode 206 is amplified by a transimpedance amplifier (TIA) 208 and then amplified by a post-amplifier (postamp) integrated circuit 104. The postamp 104 generates a fixed output swing digital signal which is connected to outside circuitry via the RX+ and RX− pins 17.

The controller IC 110 also receives a temperature input signal from a temperature sensor 210. The temperature sensor may be incorporated into the controller IC 110 or, as shown in FIG. 4, it maybe a separate device with the transceiver housing 212. The controller IC 110 is coupled to a host device through an interface 121 (FIG. 3) connected to input/output lines, typically clock (SCL) and data (SDA) lines, 15 and 16. As shown in FIG. 3, the controller IC 110 includes a General Purpose EEPROM 120 (FIG. 3) and a temperature lookup table 122 (FIG. 3) located therein. Referring to Memory Map Table 1, the temperature lookup table 122 (FIG. 3) may be situated in Array 4 or Array 5 in the memory.

The temperature lookup table 122 (FIG. 3) stores control value entries for the avalanche photodiode 206 for a range of temperatures. These correspond to the optimal reverse-bias voltages $V_{APD}$ shown in FIG. 5. Each control value entry represents the reverse-bias voltage that must be applied to the avalanche photodiode 206 at a particular temperature in order to maximize its sensitivity.

Figure 6:
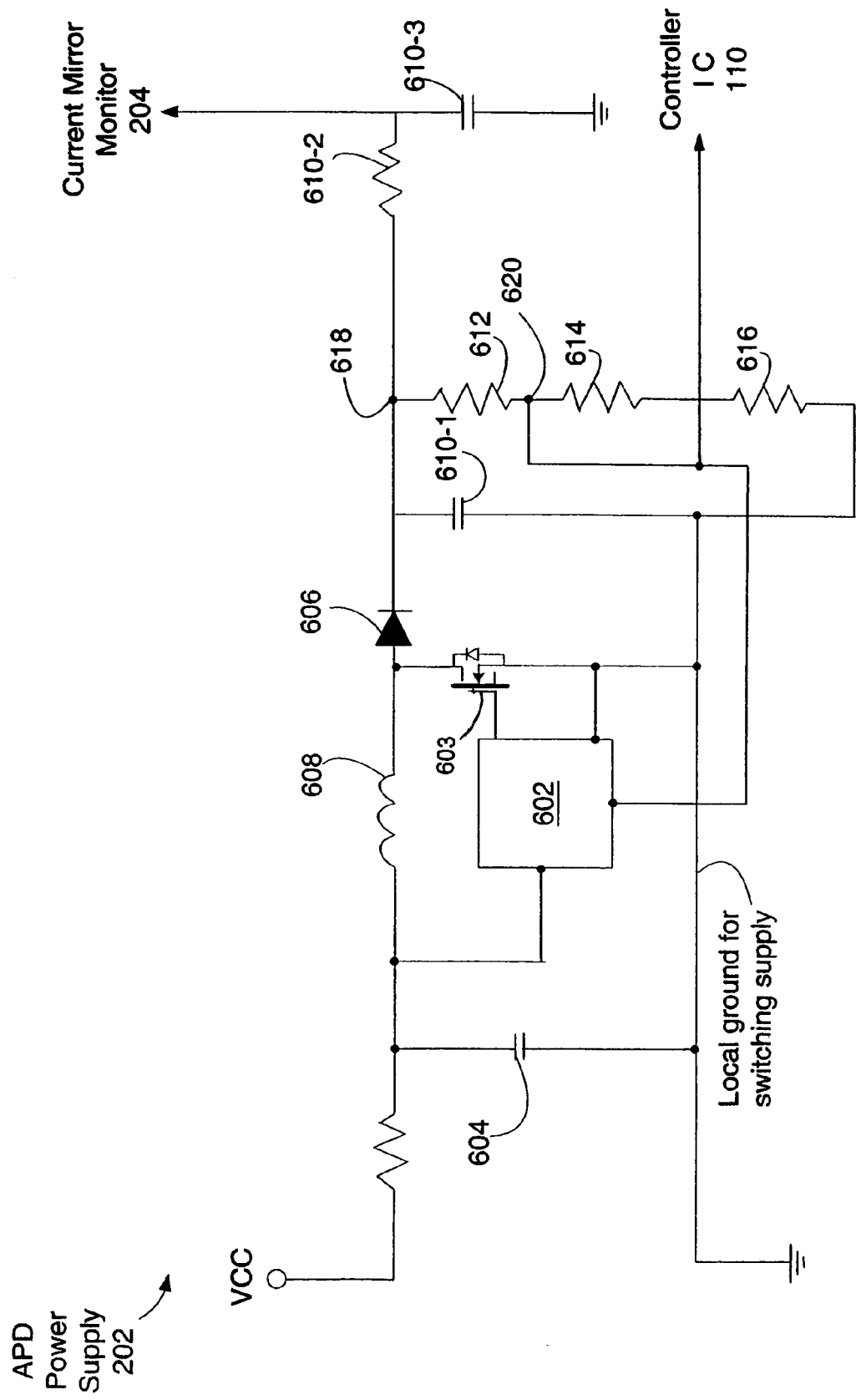
FIG. 6 is a circuit diagram of the avalanche photodiode power supply circuit in FIG. 4.

FIG. 6 is a circuit diagram of a power supply circuit 202 for an avalanche photodiode in an embodiment of the present invention. To accommodate a variety of avalanche photodiodes operating over a wide range of temperatures, the power supply must be capable of supplying up to 3 mA of current at voltages ranging from 40 volts to 70 volts. Since the voltage supplied to pluggable transceivers is typically 5 volts or 3.3 volts DC, depending on the specific application, an avalanche photodiode power supply must be a boost, DC-DC regulator, capable of converting a DC voltage of 3.3 volts up to 70 volts. A typical boost-regulator configuration is shown in FIG. 6, with a switch controller IC 602 that drives a p-channel FET transistor 603, a feedback loop consisting of a resistor divider network 612, 614 and 616 connected between node 618 and ground, an input bypassing capacitor 604, a blocking diode 606, an inductor 608, and an R-C output filter 610-1, 610-2 and 610-3. The resistor divider network 612, 614 and 616 is tapped between resistor 612 and resistor 614, and the tapped voltage is connected to the monitor pin on the switch controller IC 602. In the example shown in FIG. 6, the switch controller IC 602 is a PWM-type so that as the feedback voltage rises or dips from the reference value, the duty factor of the switch is decreased or increased respectively to regulate the output at the proper level.

Resistor 610-2 increases the dynamic range of the avalanche photodiode 206 by providing a voltage drop that is proportional to the current through the avalanche photodiode and hence to the intensity of the optical signals received by the avalanche photodiode. The voltage drop reduces the reverse bias voltage for the avalanche photodiode, and in turn reduces the current gain in the photodiode and consequently limits the current through the avalanche photodiode to prevent the avalanche photodiode from being overloaded by strong optical signals. The use of a resistor placed in series with an avalanche photodiode to increase the dynamic range of the avalanche photodiode is described in U.S. provisional application 60/355,024 entitled High Dynamic Range Optical Signal Receiver, filed Feb. 8, 2002, which is hereby incorporated by reference. Other means for increasing the dynamic range of an avalanche photodiode may also be used.

The avalanche photodiode power supply also must provide a means by which the reverse-bias voltage $V_{APD}$ can be set during the operation and calibration of the optoelectronic transceiver 100. In one embodiment, the transceiver controller IC 110 adjusts the voltage level in the feedback loop of the power supply by connecting one of the digital to analog converter/current-sinks of the controller IC 110 to a voltage divider node 620 in the feedback loop of the avalanche power supply.

Figure 7:
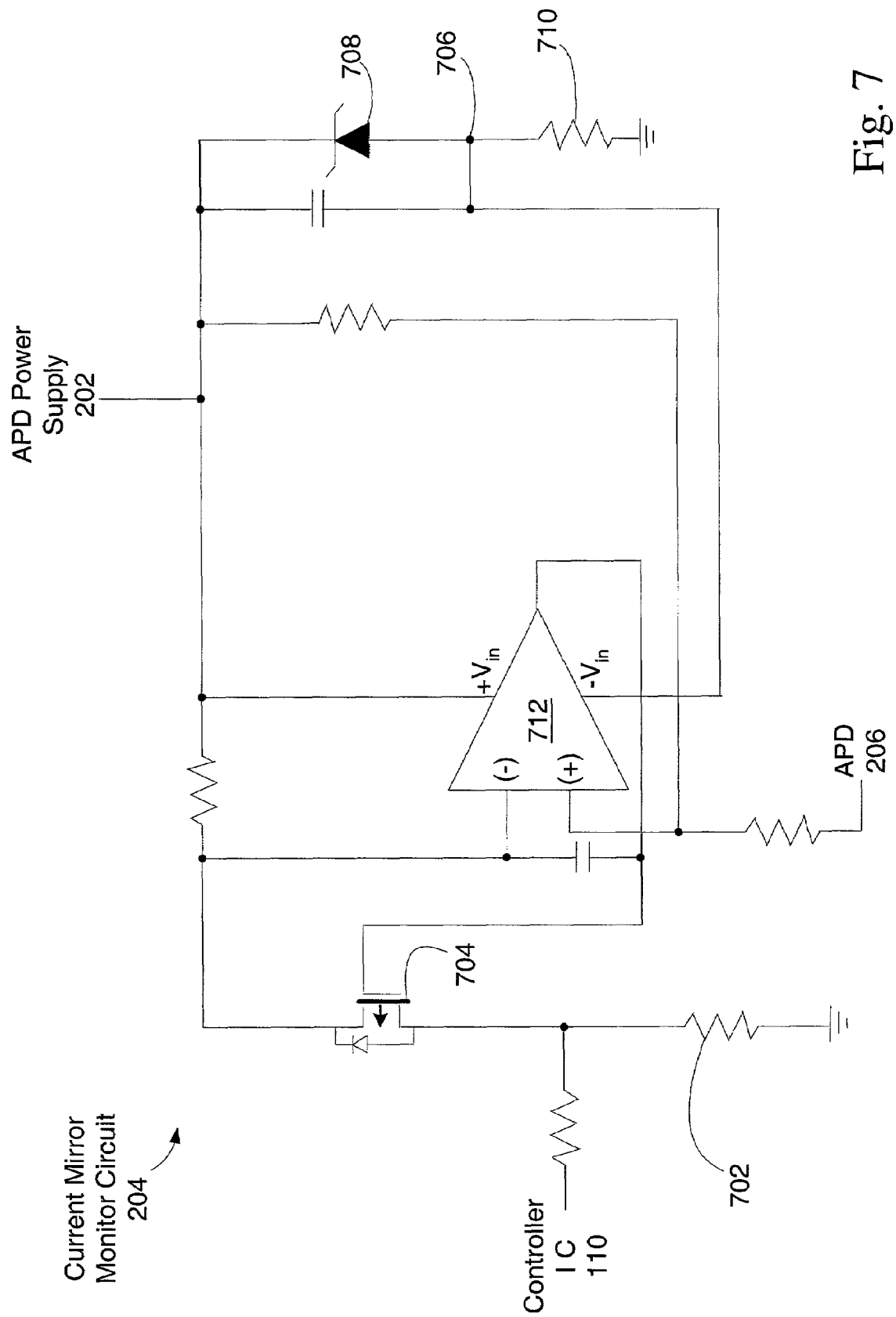
FIG. 7 is a circuit diagram of the circuit mirror monitor circuit in FIG. 4.

FIG. 7 is a circuit diagram of a current mirror monitor circuit 204 for measuring the current through an avalanche photodiode. Since the avalanche photodiode current is proportional to the power of the incident light, measuring the avalanche photodiode current is a means for monitoring the received power. In the embodiment shown in FIG. 7, the avalanche photodiode current is mirrored through a sense resistor 702 connected to ground. The voltage across the sense resistor 702 is proportional to the avalanche photodiode current, and this voltage is monitored by connecting one of the analog to digital converters in the transceiver controller IC 110 to the top of the sense resistor. The controller IC 110 applies a calibration value for the reverse-bias current to the avalanche photodiode 206, and the controller IC 110 reports the calibration value via the serial interface 121 during the calibration of the transceiver.

The current mirror monitor circuit 204 must be capable of withstanding a maximum avalanche photodiode voltage of 70 volts and a maximum current of 3 mA. In the embodiment shown in FIG. 7, an operational amplifier (opamp) 712 is used to mirror the current. The opamp 712 is arranged so that it tries to maintain equal current on both branches of the current mirror by driving a FET 704 on the sense side. Since many opamps are designed to have a supply voltage of 5 volts, the supply voltage to the opamp 712 is made to float with the positive supply set to the avalanche photodiode voltage, and the negative supply is made to float 5 volts below this level. The negative supply is made to float in this manner by connecting it to a node 706 between a zener diode 708 and a resistor 710. This zener-resistor network is connected between the avalanche photodiode voltage and ground. In other embodiments, matched transistors may be used, provided that the matched transistor pairs are selected so that they can withstand a collector-emitter voltage greater than the maximum avalanche photodiode voltage.

Figure 8:
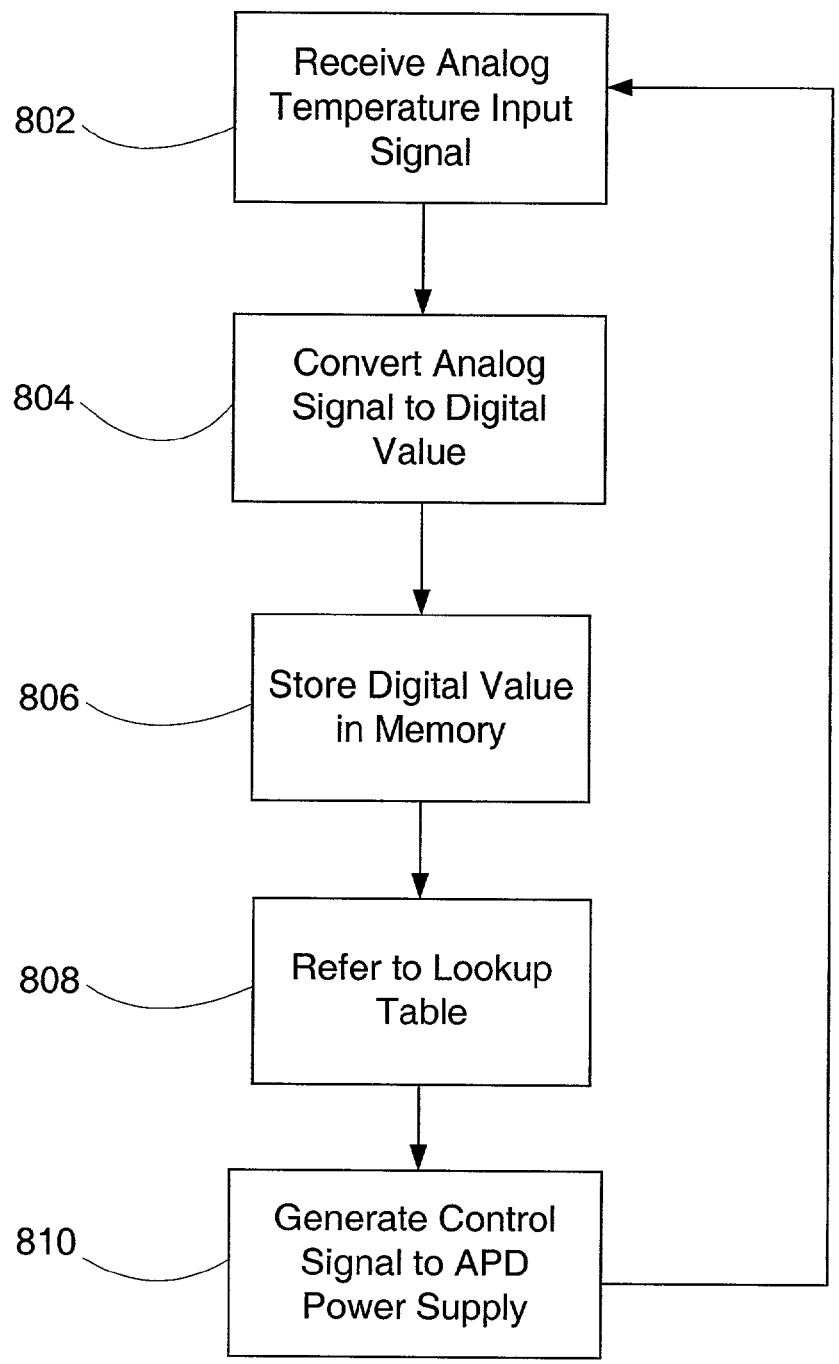
FIG. 8 is a flowchart of a method for controlling the reverse-bias voltage applied to an avalanche photodiode in accordance with an embodiment of the present invention.

FIG. 8 illustrates a method of controlling the reverse-bias voltage for an avalanche photodiode in accordance with an embodiment of this invention. During operation of the avalanche photodiode 206, an analog signal from the temperature sensor 210 is received by the controller IC 110 in step 802 and converted to a digital temperature value in step 804. The digital value is stored in the General Purpose EEPROM 120 (FIG. 3) in step 806. In step 808 logic in the controller IC determines a digital control value associated with the reverse-bias voltage for the avalanche photodiode 206 based on the digital temperature value and the entry for the control value in the temperature lookup table 122 (FIG. 3) associated wit the digital value for the temperature. If the digital temperature value falls between two entries in the temperature lookup table, the control value is preferably generated using interpolation (e.g., linear interpolation) to compute a control value between the control values in the two entries. Alternatively, a closest entry is selected and its digital control value is used. In step 810 digital to analog circuitry 123 converts the digital control value into an analog control signal that is transmitted to the power supply 202 to control the avalanche photodiode 206.

Figure 9:
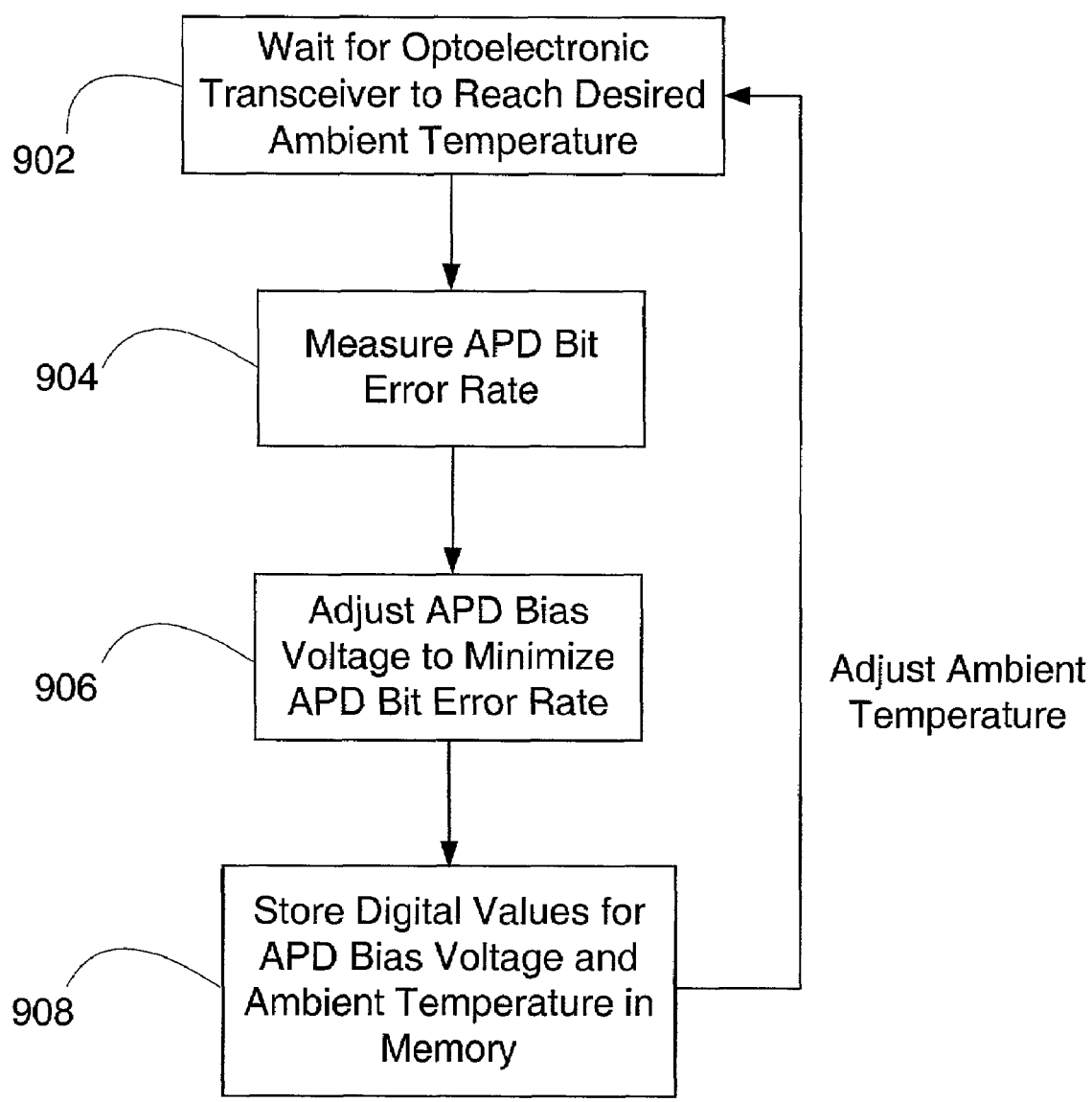
FIG. 9 is a flowchart of a method for calibrating an optoelectronic transceiver having an avalanche photodiode in accordance with an embodiment of the present invention.

The entries in the temperature lookup table 122 (FIG. 3) are determined during calibration of the optoelectronic transceiver 100. FIG. 9 is a flow-chart of a method for calibrating an optoelectronic transceiver in accordance with an embodiment of the present invention. First, in step 902 the ambient temperature of the optoelectronic transceiver 100 is allowed to reach a particular value. Next in step 904, the bit error rate for the optoelectronic transceiver is measured using techniques that are well-known to those skilled in the art. In step 906, the controller IC causes the reverse-bias voltage applied to the avalanche photodiode 206 to be adjusted until the bit error rate is minimized. The reverse-bias voltage which minimizes the bit error rate is the optimal reverse-bias voltage. A control value associated with the optimal reverse-bias voltage is stored in a temperature lookup table 122 (FIG. 3) in the controller IC 110 along with the temperature in step 908. The ambient temperature of the optoelectronic transceiver 100 is then adjusted (by heating it in an oven, for example), and the process repeated to determine a control value for one or more other temperatures. Control values for additional temperatures may be assigned by interpolation or extrapolation and stored in the temperature lookup table.

Figure 10:
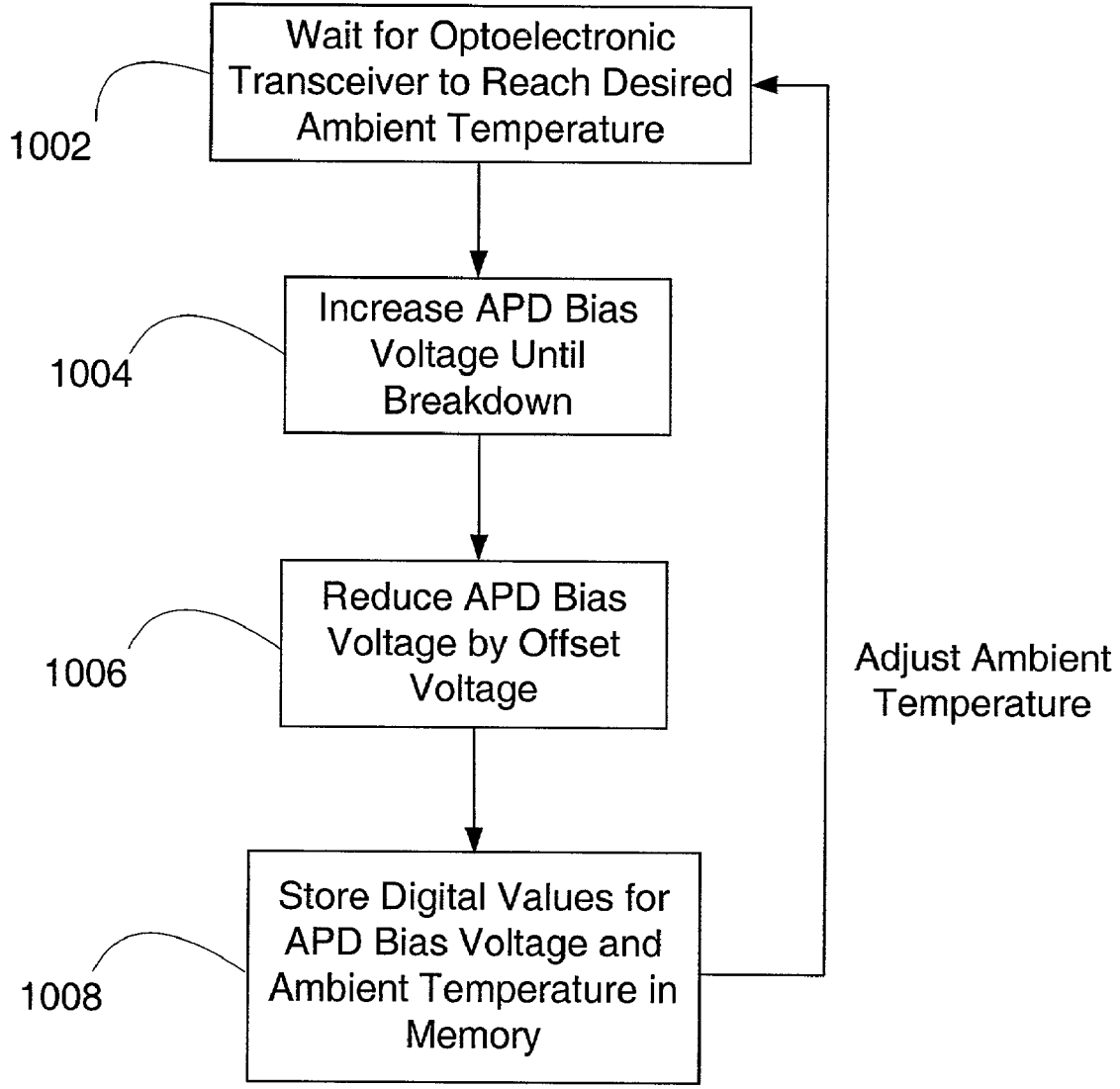
FIG. 10 is a flowchart of a method for calibrating an optoelectronic transceiver having an avalanche photodiode in accordance with another embodiment of the present invention.

FIG. 10 is a flow-chart of another method for calibrating an optoelectronic transceiver in accordance with another embodiment of the present invention. As in the method illustrated in FIG. 9, the first step 1002 involves allowing the ambient temperature of the optoelectronic transceiver 100 is allowed to reach a particular value. Next in step 1004, the controller IC causes the reverse-bias voltage applied to the avalanche photodiode 206 to increase until the current mirror signal from the current mirror monitor circuit 204 increases abruptly, which indicates the occurrence of an avalanche breakdown. The reverse-bias voltage at which the avalanche breakdown occurred is reduced by an offset voltage in step 1006 to provide an approximate optimal reverse-bias voltage. A control value associated with the approximate optimal reverse-bias voltage determined in step 1006 is stored in a temperature lookup table 122 (FIG. 3) in the controller IC 110 along with the temperature in step 1008. As with the method illustrated in FIG. 9, the ambient temperature of the optoelectronic transceiver 100 is then adjusted (by heating it in an oven, for example), and the process repeated to determine a control value for one or more other temperatures. Control values for additional temperatures may be assigned by interpolation or extrapolation and stored in the temperature lookup table.

TABLE 1

MEMORY MAP FOR TRANSCEIVER CONTROLLER

| | Name of Location | Function |
| --- | --- | --- |
| Memory Location (Array 0) | | |
| 00h–5Fh | IEEE Data | This memory block is used to store required GBIC data |
| 60h | Temperature MSB | This byte contains the MSB of the 15-bit 2's complement temperature output from the temperature sensor. |
| 61h | Temperature LSB | This byte contains the LSB of the 15-bit 2's complement temperature output from the temperature sensor. (LSB is 0b). |
| 62h–63h | $V_{cc}$ Value | These bytes contain the MSB (62h) and the LSB (63h) of the measured $V_{cc}$ (15-bit number, with a 0b LSbit) |
| 64h–65h | $B_{in}$ Value | These bytes contain the MSB (64h) and the LSB (65h) of the measured $B_{in}$ (15-bit number, with a 0b LSbit) |
| 66h–67h | $P_{in}$ Value | These bytes contain the MSB (66h) and the LSB (67h) of the measured $P_{in}$ (15-bit number, with a 0b LSbit) |
| 68h–69h | $R_{in}$ Value | These bytes contain the MSB (68h) and the LSB (69h) of the measured $R_{in}$ (15-bit number, with a 0b LSbit) |
| 6Ah–6Dh | Reserved | Reserved |
| 6Eh | IO States | This byte shows the logical value of the I/O pins. |
| 6Fh | A/D Updated | Allows the user to verify if an update from the A/D has occurred to the 5 values: temperature, Vcc, $B_{in}$, $P_{in}$ and $R_{in}$. The user |

TABLE 1-continued

MEMORY MAP FOR TRANSCEIVER CONTROLLER

| Name of Location | | Function |
|---|---|---|
| | | writes the byte to 00h. Once a conversion is complete for a give value, its bit will change to '1'. |
| 70h–73h | Alarm Flags | These bits reflect the state of the alarms as a conversion updates. High alarm bits are '1' if converted value is greater than corresponding high limit. Low alarm bits are '1' if converted value is less than corresponding low limit. Otherwise, bits are 0b. |
| 74h–77h | Warning Flags | These bits reflect the state of the warnings as a conversion updates. High warning bits are '1' if converted value is greater than corresponding high limit. Low warning bits are '1' if converted value is less than corresponding low limit. Otherwise, bits are 0b. |
| 78h–7Ah | Reserved | Reserved |
| 7Bh–7Eh | Password Entry Bytes PWE Byte 3 (7Bh) MSByte PWE Byte 2 (7Ch) PWE Byte 1 (7Dh) PWE Byte 0 (7Eh) LSByte | The four bytes are used for password entry. The entered password will determine the user's read/write privileges. |
| 7Fh | Array Select | Writing to this byte determines which of the upper pages of memory is selected for reading and writing. 0xh (Array x Selected) Where x = 1, 2, 3, 4 or 5 |
| 80h–F7h | | Customer EEPROM |
| 87h | DA % Adj | Scale output of D/A converters by specified percentage |
| Memory Location (Array 1) 00h–FFh | | Data EEPROM |
| Memory Location (Array 2) 00h–FFh | | Data EEPROM |
| Memory Location (Array 3) | | |
| 80h–81h 88h–89h 90h–91h 98h–99h A0h–A1h | Temperature High Alarm Vcc High Alarm $B_{in}$ High Alarm $P_{in}$ High Alarm $R_{in}$ High Alarm | The value written to this location serves as the high alarm limit. Data format is the same as the corresponding value (temperature, Vcc, $B_{in}$, $P_{in}$ $R_{in}$). |
| 82h–83h 8Ah–8Bh 92h–93h 9Ah–9Bh A2h–A3h A2h–A3h | Temperature Low Alarm Vcc Low Alarm $B_{in}$ Low Alarm $P_{in}$ Low Alarm $R_{in}$ Low Alarm | The value written to this location serves as the low alarm limit. Data format is the same as the corresponding value (temperature, Vcc, $B_{in}$, $P_{in}$ $R_{in}$). |
| 84h–85h 8Ch–8Dh 94h–95h 9Ch–9Dh A4h–A5h | Temp High Warning Vcc High Warning $B_{in}$ High Warning $P_{in}$ High Warning $R_{in}$ High Warning | The value written to this location serves as the high warning limit. Data format is the same as the corresponding value (temperature, Vcc, $B_{in}$, $P_{in}$ $R_{in}$). |
| 86h–87h 8Eh–8Fh 96h–97h 9Eh–9Fh A6h–A7h | Temperature Low Warning Vcc Low Warning $B_{in}$ Low Warning $P_{in}$ Low Warning $R_{in}$ Low Warning | The value written to this location serves as the low warning limit. Data format is the same as the corresponding value (temperature, Vcc, $B_{in}$, $P_{in}$ $R_{in}$). |
| A8h–AFh, C5h B0h–B7h, C6h B8h–BFh, C7h | $D_{out}$ control 0–8 $F_{out}$ control 0–8 $L_{out}$ control 0–8 | Individual bit locations are defined in Table 4. |
| C0h | Reserved | Reserved |
| C1h | Prescale | Selects MCLK divisor for X-delay CLKS. |
| C2h | $D_{out}$ Delay | Selects number of prescale clocks |

TABLE 1-continued

MEMORY MAP FOR TRANSCEIVER CONTROLLER

| | Name of Location | Function |
|---|---|---|
| C3h | $F_{out}$ Delay | |
| C4h | $L_{out}$ Delay | |
| C8h–C9h | Vcc - A/D Scale | 16 bits of gain adjustment for corresponding A/D conversion values. |
| CAh–CBh | $B_{in}$ - A/D Scale | |
| CCh–CDh | $P_{in}$ - A/D Scale | |
| CEh–CFh | $R_{in}$ - A/D Scale | |
| D0h | Chip Address | Selects chip address when external pin ASEL is low. |
| D1h | Margin #2 | Finisar Selective Percentage (FSP) for D/A #2 |
| D2h | Margin #1 | Finisar Selective Percentage (FSP) for D/A #1 |
| D3h–D6h | PW1 Byte 3 (D3h) MSB<br>PW1 Byte 2 (D4h)<br>PW1 Byte 1 (D5h)<br>PW1 Byte 0 (D6h) LSB | The four bytes are used for password 1 entry. The entered password will determine the Finisar customer's read/write privileges. |
| D7h | D/A Control | This byte determines if the D/A outputs source or sink current, and it allows for the outputs to be scaled. |
| D8h–DFh | $B_{in}$ Fast Trip | These bytes define the fast trip comparison over temperature. |
| E0h–E3h | $P_{in}$ Fast Trip | These bytes define the fast trip comparison over temperature. |
| E4h–E7h | $R_{in}$ Fast Trip | These bytes define the fast trip comparison over temperature. |
| E8h | Configuration Override Byte | Location of the bits is defined in Table 4 |
| E9h | Reserved | Reserved |
| EAh–EBh | Internal State Bytes | Location of the bits is defined in Table 4 |
| ECh | I/O States 1 | Location of the bits is defined in Table 4 |
| EDh–EEh | D/A Out | Magnitude of the temperature compensated D/A outputs |
| EFh | Temperature Index | Address pointer to the look-up Arrays |
| F0h–FFh | Reserved | Reserved |
| Memory Location (Array 4) 00h–FFh | | D/A Current vs. Temp #1 (User-Defined Look-up Array #1) |
| Memory Location (Array 5) 00h–FFh | | D/A Current vs. Temp #2 (User-Defined Look-up Array #2) |

TABLE 2

Detail Memory Descriptions - A/D Values and Status Bits

| Byte | Bit | Name | Description |
|---|---|---|---|
| Converted analog values. Calibrated 16 bit data. (See Notes 1–2) | | | |
| 96 (60h) | All | Temperature MSB | Signed 2's complement integer temperature (−40 to +125 C.) Based on internal temperature measurement |
| 97 | All | Temperature LSB | Fractional part of temperature (count/256) |
| 98 | All | Vcc MSB | Internally measured supply voltage in transceiver. Actual voltage is full 16 bit value * 100 uVolt. |
| 99 | All | Vcc LSB | (Yields range of 0–6.55V) |
| 100 | All | TX Bias MSB | Measured TX Bias Current in mA Bias current is full 16 bit value *(1/256) mA. |
| 101 | All | TX Bias LSB | (Full range of 0–256 mA possible with 4 uA resolution) |
| 102 | All | TX Power MSB | Measured TX output power in mW. Output is full 16 bit value *(1/2048) mW. (see note 5) |
| 103 | All | TX Power LSB | (Full range of 0–32 mW possible with 0.5 μW resolution, or −33 to +15 dBm) |
| 104 | All | RX Power MSB | Measured RX input power in mW RX power is full 16 bit value *(1/16384) mW. (see note 6) |
| 105 | All | RX Power LSB | (Full range of 0–4 mW possible with 0.06 μW resolution, or −42 to +6 dBm) |
| 106 | All | Reserved MSB | Reserved for 1st future definition of digitized analog input |
| 107 | All | Reserved LSB | Reserved for 1st future definition of digitized analog input |

TABLE 2-continued

Detail Memory Descriptions - A/D Values and Status Bits

| Byte | Bit | Name | Description |
|---|---|---|---|
| 108 | All | Reserved MSB | Reserved for 2$^{nd}$ future definition of digitized analog input |
| 109 | All | Reserved LSB | Reserved for 2$^{nd}$ future definition of digitized analog input |

General Status Bits

| Byte | Bit | Name | Description |
|---|---|---|---|
| 110 | 7 | TX Disable | Digital state of the TX Disable Input Pin |
| 110 | 6 | Reserved | |
| 110 | 5 | Reserved | |
| 110 | 4 | Rate Select | Digital state of the SFP Rate Select Input Pin |
| 110 | 3 | Reserved | |
| 110 | 2 | TX Fault | Digital state of the TX Fault Output Pin |
| 110 | 1 | LOS | Digital state of the LOS Output Pin |
| 110 | 0 | Power-On-Logic | Indicates transceiver has achieved power up and data valid |
| 111 | 7 | Temp A/D Valid | Indicates A/D value in Bytes 96/97 is valid |
| 111 | 6 | Vcc A/D Valid | Indicates A/D value in Bytes 98/99 is valid |
| 111 | 5 | TX Bias A/D Valid | Indicates A/D value in Bytes 100/101 is valid |
| 111 | 4 | TX Power A/D Valid | Indicates A/D value in Bytes 102/103 is valid |
| 111 | 3 | RX Power A/D Valid | Indicates A/D value in Bytes 104/105 is valid |
| 111 | 2 | Reserved | Indicates A/D value in Bytes 106/107 is valid |
| 111 | 1 | Reserved | Indicates A/D value in Bytes 108/109 is valid |
| 111 | 0 | Reserved | Reserved |

TABLE 3

Detail Memory Descriptions - Alarm and Warning Flag Bits
Alarm and Warning Flag Bits

| Byte | Bit | Name | Description |
|---|---|---|---|
| 112 | 7 | Temp High Alarm | Set when internal temperature exceeds high alarm level. |
| 112 | 6 | Temp Low Alarm | Set when internal temperature is below low alarm level. |
| 112 | 5 | Vcc High Alarm | Set when internal supply voltage exceeds high alarm level. |
| 112 | 4 | Vcc Low Alarm | Set when internal supply voltage is below low alarm level. |
| 112 | 3 | TX Bias High Alarm | Set when TX Bias current exceeds high alarm level. |
| 112 | 2 | TX Bias Low Alarm | Set when TX Bias current is below low alarm level. |
| 112 | 1 | TX Power High Alarm | Set when TX output power exceeds high alarm level. |
| 112 | 0 | TX Power Low Alarm | Set when TX output power is below low alarm level. |
| 113 | 7 | RX Power High Alarm | Set when Received Power exceeds high alarm level. |
| 113 | 6 | RX Power Low Alarm | Set when Received Power is below low alarm level. |
| 113 | 5–0 | Reserved Alarm | |
| 114 | All | Reserved | |
| 115 | All | Reserved | |
| 116 | 7 | Temp High Warning | Set when internal temperature exceeds high warning level. |
| 116 | 6 | Temp Low Warning | Set when internal temperature is below low warning level. |
| 116 | 5 | Vcc High Warning | Set when internal supply voltage exceeds high warning level. |
| 116 | 4 | Vcc Low Warning | Set when internal supply voltage is below low warning level. |
| 116 | 3 | TX Bias High Warning | Set when TX Bias current exceeds high warning level. |
| 116 | 2 | TX Bias Low Warning | Set when TX Bias current is below low warning level. |
| 116 | 1 | TX Power High Warning | Set when TX output power exceeds high warning level. |
| 116 | 0 | TX Power Low Warning | Set when TX output power is below low warning level. |

TABLE 3-continued

Detail Memory Descriptions - Alarm and Warning Flag Bits
Alarm and Warning Flag Bits

| Byte | Bit | Name | Description |
|---|---|---|---|
| 117 | 7 | RX Power High Warning | Set when Received Power exceeds high warning level. |
| 117 | 6 | RX Power Low Warning | Set when Received Power is below low warning level. |
| 117 | 5 | Reserved Warning | |
| 117 | 4 | Reserved Warning | |
| 117 | 3 | Reserved Warning | |
| 117 | 2 | Reserved Warning | |
| 117 | 1 | Reserved Warning | |
| 117 | 0 | Reserved Warning | |
| 118 | All | Reserved | |
| 119 | All | Reserved | |

TABLE 4

| Byte Name | Bit 7 | Bit 6 | Bit 5 | Bit 4 | Bit 3 | Bit 2 | Bit 1 | Bit 0 |
|---|---|---|---|---|---|---|---|---|
| X-out cntl0 | T alrm hi set | T alrm lo set | V alrm hi set | V alrm lo set | B alrm hi set | B alrm lo set | P alrm hi set | P alrm lo set |
| X-out cntl1 | R alrm hi set | R alrm lo set | B ft hi set | P ft hi set | R ft hi set | D-in inv set | D-in set | F-in inv set |
| X-out cntl2 | F-in set | L-in inv set | L-in set | Aux inv set | Aux set | T alrm hi hib | T alrm lo hib | V alrm hi hib |
| X-out cntl3 | V alrm lo hib | B alrm hi hib | B alrm lo hib | P alrm hi hib | P alrm lo hib | R alrm hi hib | R alrm lo hib | B ft hi hib |
| X-out cntl4 | P ft hi hib | R ft hi hib | D-in inv hib | D-in hib | F-in inv hib | F-in hib | L-in inv hib | L-in hib |
| X-out cntl5 | Aux inv hib | Aux hib | T alrm hi clr | T alrm lo clr | V alrm hi clr | V alrm lo clr | B alrm hi clr | B alrm lo clr |
| X-out cntl6 | P alrm hi clr | P alrm lo clr | R alrm hi clr | R alrm lo clr | B ft hi clr | P ft hi clr | R ft hi clr | D-in inv clr |
| X-out cntl7 | D-in clr | F-in inv clr | F-in clr | L-in inv clr | L-in clr | Aux inv clr | Aux clr | EE |
| X-out cntl8 | latch select | invert | o-ride data | o-ride select | S reset data | Hi enable | LO enable | Pullup enable |
| Prescale | reserved | reserved | Reserved | reserved | $B^3$ | $B^2$ | $B^1$ | $B^0$ |
| X-out delay | $B^7$ | $B^6$ | $B^5$ | $B^4$ | $B^3$ | $B^2$ | $B^1$ | $B^0$ |
| chip address | $b^7$ | $b^6$ | $b^5$ | $b^4$ | $b^3$ | $b^2$ | $b^1$ | X |
| X-ad scale MSB | $2^{15}$ | $2^{14}$ | $2^{13}$ | $2^{12}$ | $2^{11}$ | $2^{10}$ | $2^9$ | $2^8$ |
| X-ad scale LSB | $2^7$ | $2^6$ | $2^5$ | $2^4$ | $2^3$ | $2^2$ | $2^1$ | $2^0$ |

| D/A cntl | source/sink | D/A #2 range | | | source/sink | D/A #1 range | | |
|---|---|---|---|---|---|---|---|---|
| | 1/0 | $2^2$ | $2^1$ | $2^0$ | 1/0 | $2^2$ | $2^1$ | $2^0$ |
| config/O-ride | manual D/A | manual index | manual AD alarm | EE Bar | SW-POR | A/D Enable | Manual fast alarm | reserved |
| Internal State 1 | D-set | D-inhibit | D-delay | D-clear | F-set | F-inhibit | F-delay | F-clear |
| Internal State 0 | L-set | L-inhibit | L-delay | L-clear | reserved | reserved | reserved | reserved |
| I/O States 1 | reserved | F-in | L-in | reserved | D-out | reserved | reserved | reserved |
| Margin #1 | Reserved | Neg_Scale2 | Neg_Scale1 | Neg_Scale0 | Reserved | Pos_Scale2 | Pos_Scale1 | Pos_Scale0 |
| Margin #2 | Reserved | Neg_Scale2 | Neg_Scale1 | Neg_Scale0 | Reserved | Pos_Scale2 | Pos_Scale1 | Pos_Scale0 |

While the combination of all of the above functions is desired in some embodiments of this transceiver controller, it should be obvious to one skilled in the art having the benefit of this disclosure that a device which only implements a subset of these functions would also be of great use. Similarly, the present invention is also applicable to optoelectronic receivers, and thus is not solely applicable to transceivers. Finally, it should be pointed out that the controller of the present invention is suitable for application of multichannel optical links.

The foregoing descriptions of specific embodiments of the present invention are presented for purposes of illustration and explanation. The embodiments were chosen and described in order to best explain the principles of the invention and its practical applications, to thereby enable others skilled in the art to best utilize the invention. They are not intended to be exhaustive or to limit the invention to the precise forms disclosed. Various modifications may occur to those skilled in the art having the benefit of this disclosure without departing from the inventive concepts described herein. Accordingly, it is the claims, not merely the foregoing illustration, that are intended to define the exclusive rights of the invention.

What is claimed is:

1. An optoelectronic assembly, selected from one of an optoelectronic transceiver and an optoelectronic receiver, comprising:
a housing;
an avalanche photodiode disposed within the housing;
a power supply disposed within the housing to supply a reverse-bias voltage to the avalanche photodiode, wherein the power supply comprises:
a switch controller that drives a transistor; and
a feedback loop including a resistor divider network connected with the switch controller;
a current mirror connected with the power supply to mirror a current in the avalanche photodiode, the mirrored current flowing through a sense resistor, the voltage across the sense resistor being proportional to the current in the avalanche photodiode; and
an integrated circuit disposed within the housing, wherein the integrated circuit stores at least one digital value associated with the avalanche photodiode for controlling the reverse-bias voltage supplied to the avalanche photodiode, the at least one digital value including the data describing the temperature of the avalanche photodiode, wherein the integrated circuit connects with the resistor divider network of the feedback loop to use the at least one digital value to adjust a duty cycle of the transistor in order to adjust the reverse-bias voltage supplied to the avalanche photodiode by the power supply.

2. The optoelectronic assembly of claim 1, further comprising a temperature sensor disposed within the housing to measure temperature of the avalanche photodiode, wherein the integrated circuit is configured to process a temperature signal received from the temperature sensor.

3. The optoelectronic assembly of claim 1, wherein the current mirror includes an operational amplifier, a zener diode, and a resistor, the operational amplifier having a supply voltage coupled to a node between the zener diode and the resistor, the zener diode causing the supply voltage to float with the reverse-bias voltage supplied to the avalanche photodiode.

4. An optoelectronic assembly, selected from one of an optoelectronic transceiver and an optoelectronic receiver, comprising:
a housing;
an avalanche photodiode disposed within the housing;
a power supply disposed within the housing to supply a reverse-bias voltage to the avalanche photodiode, the power supply comprising:
a switch controller that drives a transistor; and
a feedback loop including a resistor divider network connected with the switch controller;
a current mirror monitor circuit connected with the power supply that mirrors a current in the avalanche photodiode, the mirrored current flowing through a sense resistor, the voltage across the sense resistor being proportional to the current in the avalanche photodiode, the current mirror monitor circuit including an operational amplifier and a zener diode, the operational amplifier having a supply voltage, the zener diode causing the supply voltage to float with the reverse-bias voltage supplied to the avalanche photodiode; and
an integrated circuit disposed within the housing that monitors the voltage across the sense resistor and is configured to output a control signal to the power supply, wherein the control signal controls the reverse-bias voltage supplied to the avalanche photodiode by the power supply, and wherein the integrated circuit connects with the resistor divider network of the feedback loop so that the control signal adjusts a duty cycle of the transistor in order to adjust the reverse-bias voltage supplied to the avalanche photodiode by the power supply.

5. The optoelectronic assembly of claim 4, further comprising a temperature sensor disposed within the housing to measure temperature of the avalanche photodiode, wherein the integrated circuit is configured to process a temperature signal received from the temperature sensor.

6. The optoelectronic assembly of claim 5, wherein the integrated circuit comprises:
memory, including one or more nonvolatile memory arrays for storing information related to the avalanche photodiode;
an interface for reading from and writing to locations within the memory in accordance with commands from a host device;
analog to digital conversion circuitry for receiving an analog signal, converting the received analog signal into a digital value, and storing the digital value in a predefined location within the memory, wherein the received analog signal is one of the temperature signal and the monitored voltage;
logic configured to determine a control value associated with a reverse-bias voltage for the avalanche photodiode in accordance with one or more digital values stored in the memory; and
digital to analog circuitry configured to convert the control value to the control signal to control the reverse-bias voltage supplied to the avalanche photodiode.

7. The optoelectronic assembly of claim 4, wherein the integrated circuit comprises:
memory, including one or more nonvolatile memory arrays for storing information related to the avalanche photodiode;
an interface for reading from and writing to locations within the memory in accordance with commands from a host device;
a temperature sensor to measure temperature;
analog to digital conversion circuitry for receiving an analog signal from the temperature sensor, converting the received analog signal into a digital value, and storing the digital value in a predefined location within the memory;
logic configured to determine a control value associated with a reverse-bias voltage for the avalanche photodiode in accordance with one or more digital values stored in the memory; and
digital to analog circuitry configured to convert the control value to the control signal to control the reverse-bias voltage supplied to the avalanche photodiode.

8. The optoelectronic assembly of claim 4, further comprising a temperature sensor disposed within the housing to measure temperature of the avalanche photodiode, wherein the integrated circuit comprises:
- memory, including one or more memory arrays for storing information related to the avalanche photodiode;
- an interface for reading from and writing to locations within the memory in accordance with commands from a host device;
- analog to digital conversion circuitry for receiving an analog signal from the temperature sensor, converting the received analog signal into a digital value, and storing the digital value in a predefined location within the memory;
- logic configured to determine a control value associated with a reverse-bias voltage for the avalanche photodiode in accordance with one or more digital values stored in the memory; and
- digital to analog circuitry configured to convert the control value to the control signal to control the reverse-bias voltage supplied to the avalanche photodiode.

9. The optoelectronic assembly of claim 8, wherein the memory includes a lookup table having a plurality of entries, and the integrated circuit is configured to determine the control value based in part on one of the plurality of entries in the lookup table.

10. The optoelectronic assembly of claim 8, wherein the integrated circuit is configured to determine the control value based in part on digital values corresponding to an analog signal received from the temperature sensor.

* * * * *

UNITED STATES PATENT AND TRADEMARK OFFICE
CERTIFICATE OF CORRECTION

PATENT NO.      : 7,155,133 B2
APPLICATION NO. : 10/101258
DATED           : December 26, 2006
INVENTOR(S)     : Stewart et al.

It is certified that error appears in the above-identified patent and that said Letters Patent is hereby corrected as shown below:

Title Page
Page 1, Column 1, Inventors, after "Anthony Ho", change "Sunnyvale" to --Richmond--
Page 2, Column 2, remove reference [EP 1006591A2 *  6/2000]

Figure 1:
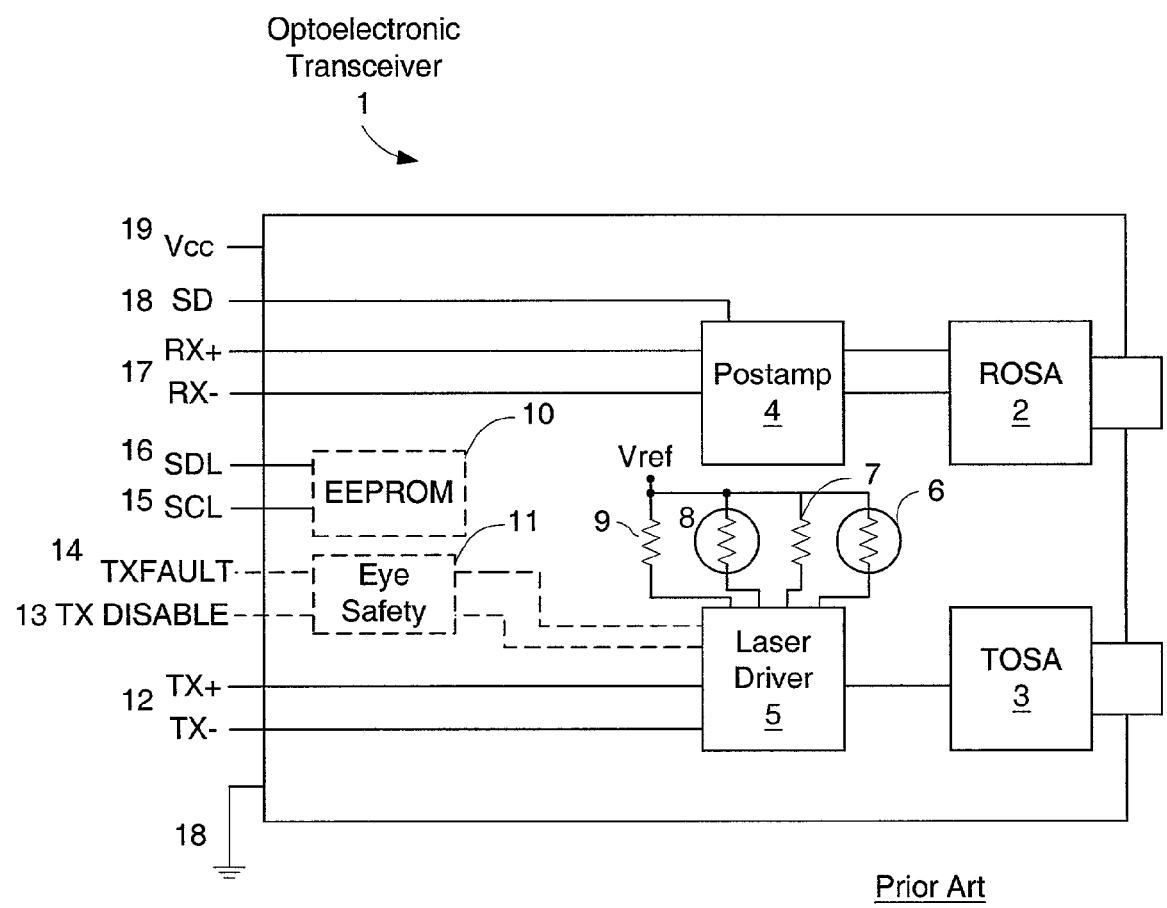
FIG. 1 is a block diagram of a prior art optoelectronic transceiver.

Drawings
Sheet 1, replace Fig. 1 with the figure depicted herein below, wherein the reference for SD has been changed from "18" to --20-- and the reference "SDL" has been changed to --SDA--

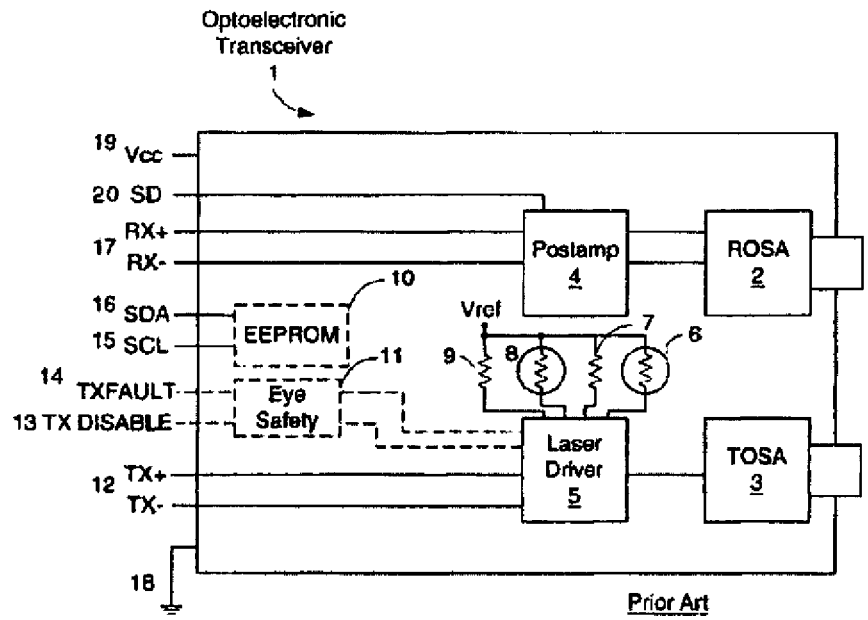

Fig. 1

CERTIFICATE OF CORRECTION (continued)
U.S. Pat. No. 7,155,133 B2

Column 1
Line 41, change "18" to --20--

Column 4
Line 62, change "11" to --110--
Line 67, change "121" to --122--

Column 6
Line 3, change "11" to --110--
Line 8, after the first instance of "controller IC", insert --110--
Line 13, unbold "12"

Column 7
Line 37, unbold "4"
Line 37, unbold "5"

Signed and Sealed this

Fifth Day of January, 2010

David J. Kappos
*Director of the United States Patent and Trademark Office*